United States Patent [19]

Knapp

[11] Patent Number: 5,586,745
[45] Date of Patent: Dec. 24, 1996

[54] VALUE FOR CONTROLLING FLOW OF CRYOGENIC FLUID

[75] Inventor: Philip A. Knapp, Moore, Id.

[73] Assignee: The United States of America as represented by the United States Department of Energy, Washington, D.C.

[21] Appl. No.: 462,338

[22] Filed: Jun. 5, 1995

[51] Int. Cl.⁶ .................................................. F16K 47/00
[52] U.S. Cl. ............................................ 251/121; 251/903
[58] Field of Search ................................. 251/120, 121, 251/205, 903; 137/904

[56] References Cited

U.S. PATENT DOCUMENTS

| 1,801,959 | 4/1931 | Hopkins | 137/903 X |
| 2,964,292 | 3/1960 | Lane | 251/218 X |
| 3,511,475 | 5/1970 | Pfau . | |
| 3,598,145 | 6/1969 | Wolfson . | |
| 3,761,053 | 9/1973 | Bedo et al. | 251/903 X |
| 3,902,695 | 9/1975 | Worwetz . | |
| 3,905,424 | 9/1975 | Elwood et al. . | |
| 4,687,180 | 8/1987 | Simonelli et al. | 251/903 X |
| 4,705,062 | 11/1987 | Baker . | |
| 4,766,927 | 8/1988 | Conatser . | |
| 4,923,173 | 5/1990 | Szymaszek et al. . | |
| 4,956,975 | 9/1990 | Gustafson . | |
| 5,417,245 | 5/1995 | King et al. | 251/205 X |
| 5,419,531 | 5/1995 | Hoehn | 251/903 X |

Primary Examiner—Hoang Nguyen
Attorney, Agent, or Firm—Colette C. Muenzen; William R. Moser; Paul A. Gottlieb

[57] ABSTRACT

A valve is provided for accurately controlling the flow of cryogenic fluids such as liquid nitrogen. The valve comprises a combination of disc and needle valves affixed to a valve stem in such a manner that the disc and needle are free to rotate about the stem, but are constrained in lateral and vertical movements. This arrangement provides accurate and precise fluid flow control and positive fluid isolation.

25 Claims, 1 Drawing Sheet

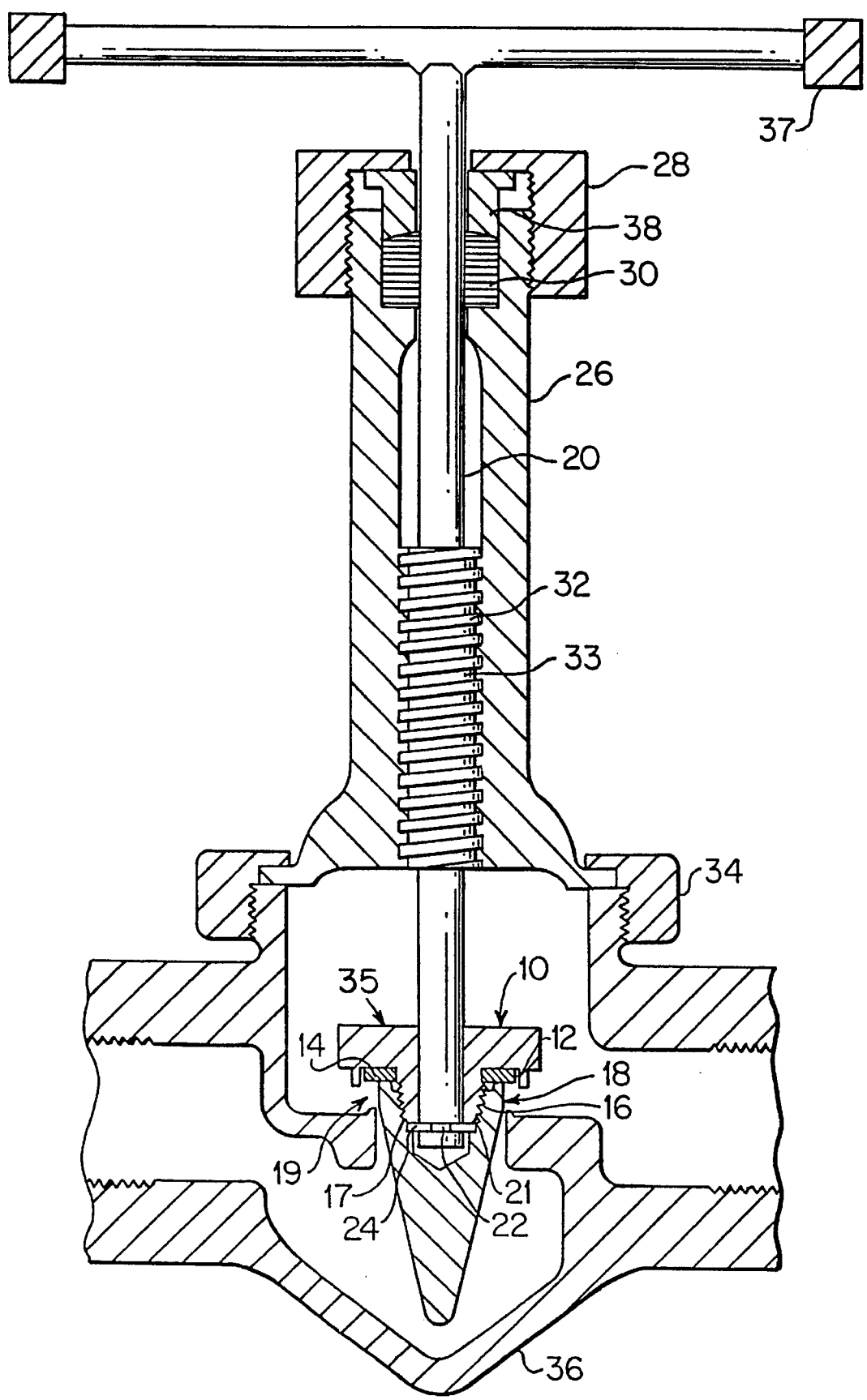

VALUE FOR CONTROLLING FLOW OF CRYOGENIC FLUID

BACKGROUND OF THE INVENTION

1. Field of the Invention

The present invention relates generally to valves, and more particularly to valves used for freeze sealing carbon and low alloy steel pipes with cryogenic fluids.

2. Description of the Prior Art

During pipe maintenance, it is often necessary to create a plug inside a pipe to prevent fluid from flowing through the pipe. This plug may be formed by wrapping copper tubing around the outside of the pipe and circulating very cold fluid through the tubing. This lowers the pipe's temperature and freezes any fluid located inside the pipe. The frozen fluid creates a solid plug, preventing any fluid flow until the pipe's temperature is raised and the plug has thawed.

At very low temperatures these pipes become subject to brittle fracture. As a result, the pipe's temperature must be carefully controlled. This temperature is controlled by drawing liquid nitrogen from a storage tank or dewar at −321° F. and warming the nitrogen to about −35° F. The nitrogen (now a gas) is then circulated through copper tubing.

For optimum protection of the pipes, the nitrogen's temperature must be maintained as close as possible to −35° F. The nitrogen's temperature may be controlled by carefully opening and closing a valve to regulate the nitrogen's mass flow rate. The degree of flow rate control is directly proportional to the precision of the valve's adjustment. Current valves are not able to accurately and precisely control nitrogen's flow rate because of three problems.

First, current valves generally employ either a needle or a disk to control fluid flow. However, neither design is suitable for creating freeze plugs. Valves employing a disk generally operate as either fully open or fully closed. Such designs are effective for total fluid isolation, but lack the requisite precision for accurately adjusting fluid flow rates. In contrast, needle valves offer more precise flow control, but do not positively stop or prevent fluid flow.

U.S. Pat. Nos. 4,705,062, by Baker and 4,923,173, by Szmaszek et al. disclose typical needle and disc valves. As discussed above, the efficiency of these valves is limited by internal movement of the valve parts and lack of positive flow isolation.

U.S. Pat. No. 3,598,145, by Wolfson, discloses a valve designed to rapidly respond to small changes in internal fluid system pressure but operates as either fully open or fully closed. This valve, like the disk valves, is inapplicable to the present application because the nitrogen temperature control method requires a valve allowing precise fluid flow control rather than operating as fully opened or closed.

The second problem limiting the application of current valve designs arises because valves currently used for precise flow rate control are not designed for use in low, i.e., cryogenic, environments. The extreme temperatures necessary for forming freeze plugs exaggerate the valves' inherent mechanical looseness leading to further loss of flow control. In addition, such extreme temperatures may also cause the valves' moveable parts to bind or structurally fail.

U.S. Pat. No. 3,511,475, by Pfau, discloses a valve which attempts to provide precise fluid flow adjustment by using a rubber-like sealing element. However, this valve is not designed for use in the harsh environment present at cryogenic temperatures.

In contrast, valves which are currently used in cryogenic environments lack adequately precise fluid control. U.S. Pat. Nos. 3,902,695, by Worwetz; 3,905,424, by Elwood et al., and 4,956,975, by Gustfson, all disclose valves designed for use in cryogenic environments. All three valves lack the necessary precision for use in the present application.

Finally, current valves also have inherent mechanical looseness. This looseness permits the internal valve assembly to float, i.e. move laterally and vertically, reducing the accuracy of flow rate control.

This movement may be controlled by securing the valve's internal members to the valve stem. For example, U.S. Pat. No. 4,766,927, by Conatser, discloses a valve designed to regulate fluid flow, volume or pressure of fluid pouring into a pump. This valve employs a split washer to secure a valve part to a valve stem. However, the split washer merely prevents the spring support from sliding off the valve stem but does not secure or stabilize the valve's interior members.

SUMMARY OF THE INVENTION

It is therefore an object of the present invention to provide a valve which will permit accurate and precise fluid flow control at low, i.e., cryogenic, temperatures.

It is a further object to provide a valve incorporating both disk and needle type flow control mechanisms.

It is a further object to provide a valve whose disk and needle flow control mechanisms are fastened to each other by internal and external threads.

In all of the above embodiments, it is an object to provide a valve whose flow control mechanisms are secured to a valve stem using a C-shaped fastener.

According to one broad aspect of the present invention, there is provided a cryogenic valve combining the elements of needle and flat disk valves. The device comprises: a body having an internal valve chamber with an inlet and an outlet communicating through the body into said valve chamber; a valve stem, the valve stem disposed at least partially in the body and in communication with the valve chamber; a needle valve disposed within the valve chamber and affixed to a distal end of the valve stem; a disk valve in communication with the needle valve and disposed within the valve chamber; a means for sealing and seating the disk valve to the needle valve, and thereby forming a needle valve assembly; and a rotating means for allowing the valve stem to rotate with respect to the needle valve assembly.

According to another broad aspect of the present invention, there is provided a valve combining the elements of needle and flat disk valves. The device comprises: a body having an internal valve chamber with an inlet and an outlet communicating through the body into the valve chamber; a valve stem, the valve stem disposed at least partially in the body and in communication with the valve chamber, and the valve stem including an annular groove located near a distal end of the valve stem; a needle valve disposed within the valve chamber and affixed to the distal end of the valve stem, the needle valve comprising a cone shaped element, the cone shaped element having a hexagonal shape at the widest end and having internal threads; a disk valve in communication with the needle valve and disposed within the valve chamber, the disk valve comprising a base, the base having a hexagonal shape; a raised central region having external threads thereon; and an annular ring region disposed on a lower surface of the base and disposed circumjacent about the raised central region; a washer disposed in the annular ring region, the washer for permitting a close fit between the disk and needle valves and for preventing fluid from leaking down the valve stem; and a rotating means for allowing the valve stem to rotate with respect to the needle valve assembly, the rotating means comprising at least a C-shaped fastener which is held between the disk valve and the needle valve and disposed in the annular groove.

To facilitate assembly and disassembly, the cone shaped needle valve and the flat disk have hexoganally shaped portions. Upon assembly of the invention, the cone shaped needle valve and the flat disk are threaded together and firmly hold the C-shaped fastener. The C-shaped fastener is fitted into the valve stem groove and permits the valve stem to rotate within the flat disk and cone shaped needle assembly. Additionally, the teflon™ washer permits the cone shaped needle and flat disk to fit tightly together and prevents fluid from leaking down the valve stem and up between the flat disk and cone shaped needle assembly.

Other objects and features of the present invention will be apparent from the following detailed description of the preferred embodiment.

BRIEF DESCRIPTION OF THE DRAWINGS

The single FIGURE in the drawings is a cross sectional elevational view of a valve constructed in accordance with a preferred embodiment of the invention.

DETAILED DESCRIPTION OF THE PREFERRED EMBODIMENT

With reference to the FIGURE, wherein like reference characters indicate like elements and, in particular, a disc 10, with a circumference flattened into a hexagon with an inset 12 machined for washer 14 and possessing raised center 16 having exterior threads 17, is attached to needle 18 formed into a cone whose circumference at the cone's widest end is flattened into a hexagonal region 19 and possessing interior threads 21 for mating with threads 17. Needle 18 and disk 10 have a centrally located hole sufficient in diameter to allow passage of valve stem 20. Groove 22 is cut around one end of valve stem 20. Upon assembly, C-shaped fastener 24 is held firmly in place, between a lower surface of raised center 16 of disc 10 and an interior surface of needle 18, while fitting into groove 22 on valve stem 20. Assembled in this configuration, C-shaped fastener 24 allows valve stem 20 to rotate freely inside needle 18 and thus forms a disk/needle assembly 35. Valve handle 37 is attached to an end of valve stem 20 opposite groove 22.

During operation, fluid flow through valve casing 36 is controlled by disk/needle assembly 35. Valve stem 20 has external threads 32 mating with internal threads 33 located inside valve stem housing 26. Fluid flow rate is controlled by turning valve handle 37 which rotates valve stem 20 causing threads 32 to engage and position disk/needle assembly 35. Washer 14 permits a close fit between needle 18 and disk 10, preventing fluid from leaking past valve stem 20 and in between needle 18 and disk 10. Valve stem housing 26 holds the entire assembly and is held against valve body 36 with nut 34. Packing 30 and packing compressor 38 are held in place with packing nut 28.

Preferably, valve housing 26 extends at least 12 inches from nut 34 to packing nut 28, to prevent frost from forming and thus causing stem 20 and handle 37 to freeze to housing 26, nut 28, packing 30, and packing compressor 38. Additionally, valve housing 26, needle 18 and disk 10 may be constructed of stainless steel, brass, or bronze. Valve stem 20 and C-shaped fastener 24 may be constructed of stainless steel. Washer 14 and packing 30 may be constructed of teflon™. It should be appreciated that it is essential that all of the above elements, 10, 18, 20, 24, 26, and 36, be constructed of materials that resist super cold temperatures such as stainless steel, brass, copper and bronze; and thus may not be constructed from carbon or low alloy steel parts. The valve handle 37 is not in contact with cryogenic fluid and therefore it may be constructed of steel, aluminum and other basic metals.

It should be appreciated that the valve may also be applicable for controlling the flow of other cryogenic fluids such as, but not limited to, argon, carbon dioxide, helium, hydrogen and oxygen.

Although the present invention has been fully described in connection with the preferred embodiment thereof with reference to the accompanying drawing, it is to be noted that various changes and modifications are apparent to those skilled in the art. Such changes and modifications are to be understood as included within the scope of the present invention as defined by the appended claims, unless they depart therefrom.

What is claimed is:

1. A cryogenic valve comprising:

a body having an internal valve chamber with an inlet and an outlet communicating through said body into said valve chamber;

a valve stem, said valve stem disposed at least partially in said body and in communication with said valve chamber;

a needle valve disposed within said valve chamber and affixed to a distal end of said valve stem;

a disk valve in communication with said needle valve and disposed within said valve chamber;

means for sealing and seating said disk valve to said needle valve, and thereby forming a needle valve assembly; and rotating means for allowing said valve stem to rotate with respect to said needle valve assembly.

2. The device recited in claim 1 wherein said disk valve comprises a base, said base having a hexagonal shape; a raised central region having external threads thereon; and an annular ring region disposed on a lower surface of said base and disposed circumjacent about said raised central region.

3. The device recited in claim 1 wherein said needle valve comprises a cone shaped element, said cone shaped element having a hexagonal shape at the widest end and having internal threads.

4. The device recited in claim 1 wherein said disk valve comprises a base, and a raised central region having external threads thereon; said needle valve comprises a cone shaped element, said cone shaped element having internal threads cooperating with said external threads.

5. The device recited in claim 4 wherein said disk valve further comprises an annular ring region disposed on a lower surface of said base and disposed circumjacent about said raised central region.

6. The device recited in claim 5, further comprising a washer disposed in said annular ring region, said washer for permitting a close fit between said disk and needle valves and for preventing cryogenic fluid from leaking past said valve stem.

7. The device recited in claim 1 wherein said valve stem includes an annular groove located near said distal end of said valve stem.

8. The device recited in claim 7 wherein said rotating means comprises a C-shaped fastener which is held between said disk valve and said needle valve and disposed in said annular groove thereby allowing said needle valve assembly to be moveable along a vertical axis upon rotation of said valve stem without imparting rotation to said needle valve assembly upon contact of said needle valve assembly with the valve body to control fluid flow through said valve chamber.

9. The device recited in claim 1 wherein said needle valve is constructed from material selected from the group consisting of steel, stainless steel, brass, copper and bronze.

10. The device recited in claim 1 wherein said valve stem is constructed from material selected from the group consisting of brass, copper, bronze and stainless steel.

11. The device recited in claim 1 wherein said disk valve is constructed from material selected from the group consisting of brass, copper, bronze and stainless steel.

12. The device recited in claim 1 wherein said sealing and seating means comprises a washer and packings.

13. The device recited in claim 11 wherein said washer and packings are constructed of teflon.

14. A valve comprising:

a body having an internal valve chamber with an inlet and an outlet communicating through said body into said valve chamber;

a valve stem, said valve stem disposed at least partially in said body and in communication with said vane chamber;

a needle valve disposed within said valve chamber and affixed to a distal end of said valve stem, said needle valve comprising a cone shaped element, said cone shaped element having a hexagonal shape at the widest end and having internal threads;

a disk valve in communication with said needle valve and disposed within said vane chamber, said disk valve comprising a base, said base having a hexagonal shape; a raised central region having external threads thereon; and an annular ring region disposed on a lower surface of said base and disposed circumjacent about said raised central region;

means for sealing and seating said disk valve to said needle valve, and thereby forming a needle valve assembly; and rotating means for allowing said valve stem to rotate with respect to said needle valve assembly.

15. The device recited in claim 14, further comprising a washer disposed in said annular ring region, said washer for permitting a close fit between said disk and needle valves and for preventing cryogenic fluid from leaking past said valve stem.

16. The device recited in claim 14 wherein said valve stem includes an annular groove located near said distal end of said valve stem.

17. The device recited in claim 16 wherein said rotating means comprises a C-shaped fastener which is held between said disk valve and said needle valve and disposed in said annular groove thereby allowing said needle valve assembly to be moveable along a vertical axis upon rotation of said valve stem without imparting rotation to said needle valve assembly upon contact of said needle valve assembly with the valve body to control fluid flow through said valve chamber.

18. A valve comprising:

a body having an internal valve chamber with an inlet and an outlet communicating through said body into said valve chamber;

a valve stem, said valve stem disposed at least partially in said body and in communication with said valve chamber, and said valve stem including an annular groove located near a distal end of said valve stem;

a needle valve disposed within said valve chamber and affixed to said distal end of said valve stem, said needle valve comprising a cone shaped element, said cone shaped element having a hexagonal shape at the widest end and having internal threads;

a disk valve in communication with said needle valve and disposed within said valve chamber, said disk valve comprising a base, said base having a hexagonal shape; a raised central region having external threads thereon; and an annular ring region disposed on a lower surface of said base and disposed circumjacent about said raised central region;

a washer disposed in said annular ring region, said washer for permitting a close fit between said disk and needle valves and for preventing fluid from leaking past said valve stem; and rotating means for allowing said valve stem to rotate with respect to said needle valve assembly, said rotating means comprising at least a C-shaped fastener which is held between said disk valve and said needle valve and disposed in said annular groove.

19. The device recited in claim 14 wherein said needle valve is constructed from material selected from the group consisting of steel, brass, copper, bronze and stainless steel.

20. The device recited in claim 1 wherein said valve stem is enclosed within a valve stem housing, said valve stem housing extending from said body so as to prevent said valve stem from freezing to said valve stem housing.

21. The device recited in claim 20 wherein said valve stem housing extends at least 12 inches from said body.

22. The device recited in claim 20 wherein said valve stem housing is constructed from material selected from the group consisting of brass, copper, bronze and stainless steel.

23. The device recited in claim 14 wherein said valve stem is enclosed within a valve stem housing, said valve stem housing extending from said body so as to prevent said valve stem from freezing to said valve stem housing.

24. The device recited in claim 23 wherein said valve stem housing extends at least 12 inches from said body.

25. The device recited in claim 23 wherein said valve stem housing is constructed from material selected from the group consisting of brass, copper, bronze and stainless steel.

* * * * *

UNITED STATES PATENT AND TRADEMARK OFFICE
CERTIFICATE OF CORRECTION

PATENT NO. : 5,586,745

DATED : December 24, 1996

INVENTOR(S) : Philip A. Knapp

It is certified that error appears in the above-identified patent and that said Letters Patent is hereby corrected as shown below:

Title page item [54], change "VALUE" to -- VALVE--;

Title page References Cited [56], change "2,964,292 3/1960" to --2,464,242 3/1949--

Title page References Cited [56] change "3,598,145 6/1969" to --3,598,145 8/1971--;

Title page, in the Abstract [57], line 3, change "disc" to --disk--

Title page, in the Abstract [57], line 4, change "disc" to --disk--

In Column 1, line 1, change "VALUE" to -- VALVE--;

In Column 1, under the title of the patent insert the following:
--The United States Government has rights in this invention pursuant to a contract awarded by the United States Department of Energy.--;

In Column 1, line 43, change "Szmaszek" to --Szymaszek--;

In Column 2, line 4, change "Gustfson" to --Gustafson--;
line 9, insert a comma after "i.e.";

UNITED STATES PATENT AND TRADEMARK OFFICE
CERTIFICATE OF CORRECTION

PATENT NO. : 5,586,745
DATED : December 24, 1996
INVENTOR(S) : Philip A. Knapp

It is certified that error appears in the above-identified patent and that said Letters Patent is hereby corrected as shown below:

In Column 3, line 2, change "down" to --past--;
line 8, change "hexoganally" to --hexagonally--;
line 13, after "needle" insert --valve--;
line 14, change "teflon™" to --TEFLON--;
line 16, change "down" to --past--;
line 17, after "needle" insert --valve--;
line 24, change "cross sectional" to --cross-sectional--;
line 32, change "disc" to --disk--;
line 33, change "inset" to --annular ring region --;
line 40, before "groove" insert --Annular--;
line 43, change "disc" to --disk--;
line 44, after "into" insert --annular--;
line 48, after "opposite" insert --annular--;
line 49, change "casing" to --body--;
line 61, before "housing" insert --stem--;
line 63, before "stem" insert --valve--;
line 63, before "housing" insert --valve stem--;
line 64, before "nut" insert --packing--;
line 65, before "housing" insert --stem--;

UNITED STATES PATENT AND TRADEMARK OFFICE
CERTIFICATE OF CORRECTION

PATENT NO. : 5,586,745
DATED : December 24, 1996
INVENTOR(S) : Philip A. Knapp

It is certified that error appears in the above-indentified patent and that said Letters Patent is hereby corrected as shown below:

In Column 4, line 2, change "teflon™" to --TEFLON--;

In Column 5, line 19, change "11" to --12--
  line 20, change "teflon" to --TEFLON--
  line 26, change "vane" to --valve--
  line 34, change "vane" to --valve--;

In Column 6, line 55, insert the following:

--26. The device recited in claim 14 wherein said disk valve is constructed from material selected from the group consisting of brass, copper, bronze and stainless steel--

Signed and Sealed this

Twenty-seventh Day of May, 1997

Attest:

BRUCE LEHMAN

Attesting Officer

Commissioner of Patents and Trademarks